(12) United States Patent
Liu et al.

(10) Patent No.: US 12,240,789 B2
(45) Date of Patent: Mar. 4, 2025

(54) HIGH-WEAR-RESISTANCE FAR-INFRARED CERAMIC POLISHED GLAZED TILE AND PREPARATION METHOD THEREFOR

(71) Applicant: MONALISA GROUP CO., LTD, Foshan (CN)

(72) Inventors: Yijun Liu, Foshan (CN); Yuandong Yang, Foshan (CN); Kelin Zhang, Foshan (CN); Xianchao Wang, Foshan (CN); Lingyan Huang, Foshan (CN)

(73) Assignee: MONALISA GROUP CO., LTD, Foshan (CN)

( * ) Notice: Subject to any disclaimer, the term of this patent is extended or adjusted under 35 U.S.C. 154(b) by 99 days.

(21) Appl. No.: 17/925,674

(22) PCT Filed: Dec. 23, 2020

(86) PCT No.: PCT/CN2020/138630
§ 371 (c)(1),
(2) Date: Nov. 16, 2022

(87) PCT Pub. No.: WO2021/232784
PCT Pub. Date: Nov. 25, 2021

(65) Prior Publication Data
US 2023/0192569 A1    Jun. 22, 2023

(30) Foreign Application Priority Data
May 19, 2020    (CN) .......................... 202010422883.0

(51) Int. Cl.
*C04B 41/52*    (2006.01)
*C03C 3/087*    (2006.01)
(Continued)

(52) U.S. Cl.
CPC ............ *C04B 41/522* (2013.01); *C03C 3/087* (2013.01); *C03C 3/095* (2013.01); *C03C 4/12* (2013.01);
(Continued)

(58) Field of Classification Search
CPC ...................................................... C04B 35/00
See application file for complete search history.

(56) References Cited

FOREIGN PATENT DOCUMENTS

| | | |
|---|---|---|
| CN | 203022281 U | 6/2013 |
| CN | 107285812 A | 10/2017 |

(Continued)

OTHER PUBLICATIONS

Zhang, L. et al., "Effects of heat treatment on far-infrared emissivity of tourmaline," Journal of Ceramics, vol. 30, No. 3, Sep. 2009, 4 pages, submitted with English abstract.

*Primary Examiner* — Austin Murata
(74) *Attorney, Agent, or Firm* — Alleman Hall & Tuttle LLP

(57) ABSTRACT

The present application provides a high-wear-resistance far-infrared ceramic polished glazed tile and preparation method therefor. The preparation method includes application of far-infrared overglaze, ink-jet printing, application of transparent far-infrared polished glaze and application of abrasion-resistant far-infrared polished glaze in sequence on a body, firing, and polishing. By adopting the far-infrared overglaze, the transparent far-infrared polished glaze and the abrasion-resistant far-infrared polished glaze in combination, the polished glaze tile can have a far-infrared function, high transparency, and high abrasion resistance.

6 Claims, 6 Drawing Sheets

(51) Int. Cl.
*C03C 3/095* (2006.01)
*C03C 4/12* (2006.01)
*C03C 8/02* (2006.01)
*C03C 8/04* (2006.01)
*C03C 8/20* (2006.01)
*C04B 41/00* (2006.01)
*C04B 41/45* (2006.01)
*C04B 41/50* (2006.01)
*C04B 41/86* (2006.01)
*C04B 41/89* (2006.01)

(52) U.S. Cl.
CPC .......... *C03C 8/02* (2013.01); *C03C 8/04* (2013.01); *C03C 8/20* (2013.01); *C04B 41/0072* (2013.01); *C04B 41/009* (2013.01); *C04B 41/4539* (2013.01); *C04B 41/4543* (2013.01); *C04B 41/5022* (2013.01); *C04B 41/86* (2013.01); *C04B 41/89* (2013.01); *C03C 2204/00* (2013.01); *C03C 2209/00* (2013.01)

(56) References Cited

FOREIGN PATENT DOCUMENTS

| | | | |
|---|---|---|---|
| CN | 107382373 | A | 11/2017 |
| CN | 108751710 | A | 11/2018 |
| CN | 111333433 | A | 6/2020 |

HIGH-WEAR-RESISTANCE FAR-INFRARED CERAMIC POLISHED GLAZED TILE AND PREPARATION METHOD THEREFOR

TECHNICAL FIELD

The present invention relates to a high-wear-resistance far-infrared ceramic polished glazed tile and preparation method therefor, which belong to the field of ceramic tile manufacturing technology.

BACKGROUND

Polished glaze tile products are highly popular with consumers because of their gorgeous colors, rich patterns, and bright glaze texture. However, the existing fully polished glaze products cannot have both transparency and abrasion resistance. Highly transparent fully polished glaze products have good transparency, clear patterns, and rich textures, but their abrasion resistance is poor. Highly abrasion-resistant fully polished glaze products have good abrasion resistance, but they are poor in transparency, leading to hazy patterns, rough textures, and poor smoothness after polishing. With the development of ceramic technology in recent years, ceramic tiles are no longer only used as decorative materials, but are combined with many functional materials, deriving many functional tiles. Far-infrared tiles have many positive effects on the human body, such as improving blood circulation, activating the activity of biological molecules, enhancing human immunity, and resisting bacteria, because they continuously emit far-infrared light waves. Some manufacturers have produced a series of far-infrared rustic tiles, but far-infrared polished glaze tiles have not yet been produced on a large scale.

Technical Problem

In view of the aforementioned problem, the objective of the present invention is to provide a polished glaze ceramic tile with a far-infrared function, high transparency, and high abrasion resistance and a preparation method thereof.

Technical Solution

In a first aspect, the present application provides a preparation method for a high-wear-resistance far-infrared ceramic polished glazed tile, which includes: application of far-infrared overglaze, ink-jet printing, application of transparent far-infrared polished glaze and application of abrasion-resistant far-infrared polished glaze in sequence on a body, firing, and polishing.

According to the present invention, by adopting the far-infrared overglaze, the transparent far-infrared polished glaze, and the abrasion-resistant far-infrared polished glaze in combination, the polished glaze tile can have a far-infrared function, high transparency, and high abrasion resistance.

Preferably, the mineral composition of the far-infrared overglaze includes 30 to 40 percent by weight of far-infrared feldspar powder, 10 to 20 percent by weight of albite, 5 to 10 percent by weight of kaolin, 15 to 25 percent by weight of quartz sand, 5 to 15 percent by weight of zirconium silicate, 5 to 10 percent by weight of calcined kaolin, and 5 to 10 percent by weight of alumina.

Preferably, the chemical composition of the far-infrared overglaze includes 63 to 73 percent by weight of $SiO_2$, 16 to 24 percent by weight of $Al_2O_3$, 0.5 to 0.7 percent by weight of $Fe_2O_3$, 0.25 to 0.35 percent by weight of $TiO_2$, 0.3 to 0.6 percent by weight of CaO, 0.4 to 1.0 percent by weight of MgO, 3.0 to 4.0 percent by weight of $K_2O$, 1.5 to 2.5 percent by weight of $Na_2O$, 120 to 180 ppm by weight of $Rb_2O$, 90 to 130 ppm by weight of $Y_2O_3$, 3.2 to 9.6 percent by weight of $ZrO_2$, and 1.1 to 1.5 percent by weight of loss on ignition.

Preferably, the mineral composition of the transparent far-infrared polished glaze includes 25 to 35 percent by weight of far-infrared feldspar powder, 8 to 12 percent by weight of zinc oxide, 5 to 8 percent by weight of barium carbonate, 7 to 9 percent by weight of calcined talc, 8 to 10 percent by weight of kaolin, and 35 to 45 percent by weight of glass frit.

Preferably, the chemical composition of the transparent far-infrared polished glaze includes 50 to 60 percent by weight of $SiO_2$, 6 to 8 percent by weight of $Al_2O_3$, 0.2 to 0.3 percent by weight of $Fe_2O_3$, 0.25 to 0.35 percent by weight of $TiO_2$, 5.5 to 8.5 percent by weight of CaO, 3.1 to 4.2 percent by weight of MgO, 3.5 to 6.5 percent by weight of BaO, 8.0 to 13.0 percent by weight of ZnO, 3.0 to 4.0 percent by weight of $K_2O$, 1.0 to 2.0 percent by weight of $Na_2O$, 100 to 155 ppm by weight of $Rb_2O$, 70 to 110 ppm by weight of $Y_2O_3$, and 2.0 to 3.5 percent by weight of loss on ignition.

Preferably, the transparent far-infrared polished glaze is applied by adopting the waterfall method, and technological parameters of the waterfall method are as follows: the specific weight is 1.80 to 1.85, and the weight is 300 g/m$^2$ to 350 g/m$^2$.

Preferably, the mineral composition of the abrasion-resistant far-infrared polished glaze includes 15 to 25 percent by weight of far-infrared feldspar powder, 10 to 15 percent by weight of zinc oxide, 12 to 16 percent by weight of barium carbonate, 7 to 9 percent by weight of calcined talc, 8 to 10 percent by weight of kaolin, 35 to 45 percent by weight of glass frit, and 4 to 6 percent by weight of 150-mesh corundum.

Preferably, the chemical composition of the abrasion-resistant far-infrared polished glaze includes 40 to 50 percent by weight of $SiO_2$, 9 to 11.5 percent by weight of $Al_2O_3$, 0.2 to 0.3 percent by weight of $Fe_2O_3$, 0.25 to 0.35 percent by weight of $TiO_2$, 6 to 8.5 percent by weight of CaO, 2.5 to 4.5 percent by weight of MgO, 9.5 to 13.0 percent by weight of BaO, 10.0 to 16.0 percent by weight of ZnO, 2.0 to 4.0 percent by weight of $K_2O$, 0.6 to 1.0 percent by weight of $Na_2O$, 60 to 110 ppm by weight of $Rb_2O$, 40 to 80 ppm by weight of $Y_2O_3$, and 3.5 to 5.0 percent by weight of loss on ignition.

Preferably, the abrasion-resistant far-infrared polished glaze is applied by adopting the waterfall method, and technological parameters of the waterfall method are as follows: the specific weight is 1.80 to 1.85, and the weight is 350 g/m$^2$ to 400 g/m$^2$.

In a second aspect, the present application provides the high-wear-resistance far-infrared ceramic polished glazed tile prepared by any of the aforementioned preparation methods.

Beneficial Effect

The far-infrared normal emissivity of the polished glaze tile can reach 0.89, the abrasion resistance can reach 6,000 revolutions (class 4), the mirror effect is good, and the transparency is high.

DETAILED DESCRIPTION OF PREFERRED EMBODIMENTS

Figure 1:
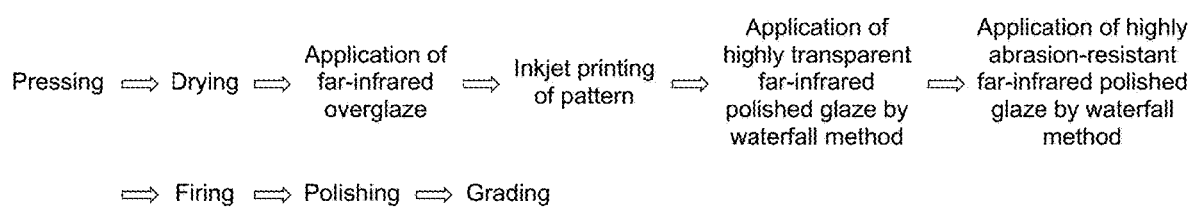
FIG. 1 is a process flowchart of an embodiment of the present invention.

The present invention will be further illustrated by the following embodiments below, and it should be understood that the following embodiments are only used to illustrate the present invention rather than to limit it. The following percentages refer to percentages by weight, unless otherwise specified.

The mineral composition of a far-infrared overglaze formula according to an embodiment of the present invention includes 30 to 40 percent by weight of far-infrared feldspar powder, 10 to 20 percent by weight of albite, 5 to 10 percent by weight of kaolin, 15 to 25 percent by weight of quartz sand, 5 to 15 percent by weight of zirconium silicate, 5 to 10 percent by weight of calcined kaolin, and 5 to 10 percent by weight of alumina. The far-infrared feldspar powder refers to a kind of feldspar powder with high far-infrared emissivity, which contains a compound of magnesium aluminum silicate with a highly asymmetric lattice doped with impurity ions, and this compound has high far-infrared emissivity. In an example, its chemical components are: 70 to 80 percent by weight of $SiO_2$, 10 to 13 percent by weight of $Al_2O_3$, 0.3 to 0.5 percent by weight of $Fe_2O_3$, 0.25 to 0.35 percent by weight of $P_2O_5$, 0.5 to 1.0 percent by weight of CaO, 0.8 to 1.2 percent by weight of MgO, 400 to 450 ppm by weight of $Rb_2O$, 280 to 320 ppm by weight of $Y_2O_3$, 8.0 to 9.0 percent by weight of $K_2O$, 2.0 to 3.0 percent by weight of $Na_2O$, and 0.5 to 1.0 percent by weight of loss on ignition. Its far-infrared emissivity can reach more than 0.91. Tourmaline, zirconium dioxide and the like are normally used in the art to provide the far-infrared function. However, tourmaline is a hydroxyl silicate compound, which will decompose above 950 degrees, leading to the destruction of structure and a great decrease in the far-infrared emissivity; and zirconium dioxide is difficult to separate and high in cost and radioactivity. The far-infrared feldspar powder is good in stability under high temperature and low in radioactivity. Since the far-infrared feldspar powder is used to provide the far-infrared function in this embodiment, high far-infrared emissivity can be achieved at a low cost, and there is no radioactivity, so no harm will be posed to the human body and environment.

The chemical composition of the far-infrared overglaze according to an embodiment of the present invention includes 63 to 73 percent by weight of $SiO_2$, 16 to 24 percent by weight of $Al_2O_3$, 0.5 to 0.7 percent by weight of $Fe_2O_3$, 0.25 to 0.35 percent by weight of $TiO_2$, 0.3 to 0.6 percent by weight of CaO, 0.4 to 1.0 percent by weight of MgO, 3.0 to 4.0 percent by weight of $K_2O$, 1.5 to 2.5 percent by weight of $Na_2O$, 3.2 to 9.6 percent by weight of $ZrO_2$, 120 to 180 ppm by weight of $Rb_2O$, 90 to 130 ppm by weight of $Y_2O_3$, and 1.1 to 1.5 percent by weight of loss on ignition. The compound of magnesium aluminum silicate with the highly asymmetric lattice formed by MgO—$SiO_2$—$Al_2O_3$ is dosed with some impurity ions (such as $Fe^{3+}$, $Y^{3+}$, $Mn^{2+}$, $Cu^{2+}$, etc.) to have the far infrared emission function.

The expansion coefficient of the far-infrared overglaze under 40° C. to 400° C. may be $8.0816 \times 10^{-6}$/K to $8.3816 \times 10^{-6}$/K.

The mineral composition of the transparent far-infrared polished glaze (or referred to as "highly transparent far-infrared polished glaze") according to an embodiment of the present invention includes 25 to 35 percent by weight of far-infrared feldspar powder, 8 to 12 percent by weight of zinc oxide, 5 to 8 percent by weight of barium carbonate, 7 to 9 percent by weight of calcined talc, 8 to 10 percent by weight of kaolin, and 35 to 45 percent by weight of glass frit. The glass frit refers to a kind of highly transparent frit, the chemical composition of which may be: 64 to 70 percent by weight of $SiO_2$, 3 to 6 percent by weight of $Al_2O_3$, 0.2 to 0.3 percent by weight of $Fe_2O_3$, 0.15 to 0.25 percent by weight of $TiO_2$, 16 to 22 percent by weight of CaO, 1 to 4 percent by weight of MgO, 2 to 4 percent by weight of $K_2O$, 0.5 to 1.5 percent by weight of $Na_2O$, and 1 to 4 percent by weight of ZnO.

The chemical composition of the transparent far-infrared polished glaze according to an embodiment of the present invention includes 50 to 60 percent by weight of $SiO_2$, 6 to 8 percent by weight of $Al_2O_3$, 0.2 to 0.3 percent by weight of $Fe_2O_3$, 0.25 to 0.35 percent by weight of $TiO_2$, 5.5 to 8.5 percent by weight of CaO, 3.1 to 4.2 percent by weight of MgO, 3.5 to 6.5 percent by weight of BaO, 8.0 to 13.0 percent by weight of ZnO, 3.0 to 4.0 percent by weight of $K_2O$, 1.0 to 2.0 percent by weight of $Na_2O$, 100 to 155 ppm by weight of $Rb_2O$, 70 to 110 ppm by weight of $Y_2O_3$, and 2.0 to 3.5 percent by weight of loss on ignition.

The aforementioned transparent far-infrared polished glaze has low $Al_2O_3$ content and high CaO, MgO, and ZnO contents; the high-temperature viscosity of the polished glaze is low, which can ensure that air bubbles in the polished glaze layer can be fully removed; and because there is no devitrifying agent in the polished glaze, the glaze layer has high transparency.

The expansion coefficient of the transparent far-infrared polished glaze under 40° C. to 400° C. may be $6.0516 \times 10^{-6}$/K to $6.4816 \times 10^{-6}$/K.

The mineral composition of the abrasion-resistant far-infrared polished glaze (or referred to as "highly abrasion-resistant far-infrared polished glaze") according to an embodiment of the present invention includes 15 to 25 percent by weight of far-infrared feldspar powder, 10 to 15 percent by weight of zinc oxide, 12 to 16 percent by weight of barium carbonate, 7 to 9 percent by weight of calcined talc, 8 to 10 percent by weight of kaolin, 35 to 45 percent by weight of glass frit, and 4 to 6 percent by weight of 150-mesh corundum. The chemical composition of the glass frit may be as described above.

The chemical composition of the abrasion-resistant far-infrared polished glaze according to an embodiment of the present invention includes 40 to 50 percent by weight of $SiO_2$, 9 to 11.5 percent by weight of $Al_2O_3$, 0.2 to 0.3 percent by weight of $Fe_2O_3$, 0.25 to 0.35 percent by weight of $TiO_2$, 6 to 8.5 percent by weight of CaO, 2.5 to 4.5 percent by weight of MgO, 9.5 to 13.0 percent by weight of BaO, 10.0 to 16.0 percent by weight of ZnO, 2.0 to 4.0 percent by weight of $K_2O$, 0.6 to 1.0 percent by weight of $Na_2O$, 60 to 110 ppm by weight of $Rb_2O$, 40 to 80 ppm by weight of $Y_2O_3$, and 3.5 to 5.0 percent by weight of loss on ignition.

The content of BaO in the aforementioned abrasion-resistant far-infrared polished glaze is high, and barium feldspar crystals can be produced under the fluxing action of ZnO and CaO. The hardness and abrasion resistance of the barium feldspar crystals are high. The magnesium aluminum silicate in the far-infrared feldspar powder in the aforementioned abrasion-resistant far-infrared polished glaze will be kept in the process of reaction, and the hardness and abrasion resistance of these magnesium aluminum silicate crystals are also high. The barium feldspar crystals, the magnesium aluminum silicate crystals and a small amount of corundum can meet the requirement of improving the hardness and abrasion resistance of polished glaze.

The expansion coefficient of the abrasion-resistant far-infrared polished glaze under 40° C. to 400° C. may be $5.9516 \times 10^{-6}/K$ to $6.1816 \times 10^{-6}/K$.

The polished glaze tile according to an embodiment of the present invention is obtained by applying the far-infrared overglaze, the transparent far-infrared polished glaze and the abrasion-resistant far-infrared polished glaze on the body and then firing the body. In a preferred embodiment, the polished glaze tile is provided with a body, a far-infrared overglaze, a pattern layer, a transparent far-infrared polished glaze layer and an abrasion-resistant far-infrared polished glaze layer from the bottom up. A preparation method for the polished glaze tile will be illustrated with reference to FIG. 1.

A body is prepared first. The body may be prepared by a method commonly used in the art. For example, a common ceramic base material is formed into the body by a press. The formed body may be dried. The expansion coefficient of the body under 40° C. to 400° C. may be $7.4816 \times 10^{-6}/K$ to $7.6816 \times \times 10^{-6}/K$.

Far-infrared overglaze is then applied on the body. The far-infrared overglaze can emit far infrared, and can cover the base color of the body and promote the color development of ink. The far-infrared overglaze may be applied by the spray glazing method or the waterfall method. The ball-milled proportions in the preparation of glaze slurry may be 70.4 to 72.4 percent of dry far-infrared overglaze, 0.11 to 0.16 percent of sodium tripolyphosphate, 0.14 to 0.21 percent of sodium methylcellulose, and 28.5 to 29.5 percent of water. The fineness may be 0.6 percent or less of residue left on a 325-mesh sieve. The technological parameters of the spray glazing method may be as follows: the specific weight is 1.40 to 1.50, and the weight is 450 g/m² to 650 g/m². These technological parameters of the spray glazing method can ensure that the overglaze is not easy to precipitate and that the uniformity of spraying is high, so that defects, such as dry pores, are not easy to form. The thickness of the far-infrared overglaze layer may be 0.25 mm to 0.30 mm.

A pattern is then inkjet-printed on the far-infrared overglaze.

Highly transparent far-infrared polished glaze is then applied. The highly transparent far-infrared polished glaze may be applied by the waterfall method. The ball-milled proportions in the preparation of glaze slurry may be: 71.5 to 73.5 percent of dry highly transparent far-infrared polished glaze, 0.14 to 0.21 percent of sodium tripolyphosphate, 0.10 to 0.12 percent of sodium methylcellulose, and 27 to 29 percent of water. The fineness may be 0.6 percent or less of residue left on a 325-mesh sieve. The technological parameters of the waterfall method may be as follows: the specific weight is 1.80 to 1.85, and the weight is 250 g/m² to 300 g/m². The technological parameters of the waterfall method can ensure that the polished glaze surface is even and smooth, and can reduce the moisture content of the glaze layer and the body. The thickness of the highly transparent far-infrared polished glaze layer may be 0.13 mm to 0.16 mm.

Highly abrasion-resistant far-infrared polished glaze is then applied. The highly abrasion-resistant far-infrared polished glaze may be applied by the waterfall method. The ball-milled proportions in the preparation of glaze slurry may be: 71.5 to 73.5 percent of dry highly abrasion-resistant far-infrared polished glaze, 0.14 to 0.21 percent of sodium tripolyphosphate, 0.10 to 0.12 percent of sodium methylcellulose, and 27 to 29 percent of water. The fineness may be 0.6 percent or less of residue left on a 325-mesh sieve. The technological parameters of the waterfall method are as follows: the specific weight is 1.80 to 1.85, and the weight is 350 g/m² to 400 g/m². The technological parameters of the waterfall method can ensure that the polished glaze surface is even and smooth, and can reduce the moisture content of the glaze layer and the body. The thickness of the highly abrasion-resistant far-infrared polished glaze layer may be 0.15 mm to 0.20 mm.

The body is then loaded into a kiln and fired. The highest firing temperature may be 1,200° C. to 1,220° C., and the firing period may be 120 to 150 minutes.

The product is taken out of the kiln and polished. In an embodiment, resilient grinding blocks are used to perform polishing after being arranged into eight 140-mesh groups, six 240-mesh groups, six 300-mesh groups, eight 400-mesh groups, four 600-mesh groups, four 800-mesh groups, four 1,000-mesh groups, four 1,500-mesh groups, four 2,000-mesh groups, and eight 3,000-mesh groups. Deep polishing can be performed when this method is adopted for polishing, so that the polished glaze surface is smoother.

In this embodiment, the combination of the highly transparent far-infrared polished glaze and the highly abrasion-resistant far-infrared polished glaze can endow the polished glaze tile with high transparency and high abrasion resistance. Moreover, since both the overglaze formula and the polished glaze formulas contain the far-infrared feldspar powder, the polished glaze tile has a strong far-infrared function. Since the far-infrared overglaze, the highly transparent far-infrared polished glaze and the highly abrasion-resistant far-infrared polished glaze in the present invention all contain the far-infrared material, a stronger far-infrared function can be achieved. If only one of them has the far-infrared function, the far-infrared emissivity of the polished glaze tile will be low. Since the highly transparent far-infrared polished glaze and the highly abrasion-resistant far-infrared polished glaze in the present invention are low in expansion coefficient and thick as glaze layers, the tile shape can be easily arched, making polishing difficult. The high expansion coefficient of the far-infrared polished overglaze can play the role of adjusting the tile shape. Moreover, due to the low content of aluminum and the high content of fluxes (such as calcium, magnesium and zinc) in the highly transparent far-infrared polished glaze, the fluidity of the abrasion-resistant far-infrared polished glaze in the process of firing can be increased, so that the glaze surface of the far-infrared polished glaze is smoother, which is conducive to polishing, and barium feldspar in the highly abrasion-resistant far-infrared polished glaze is easier to crystallize and grow to a certain size.

Here, a production technique combining far-infrared materials with the adjustment of polished glaze formulas is provided, achieving the abrasion resistance and far-infrared function of polished glaze tiles. The far-infrared normal emissivity of the polished product can reach more than 0.89, the abrasion resistance can reach 6,000 revolutions (class 4), the mirror effect is good, and the transparency is high.

DETAILED DESCRIPTION OF EMBODIMENTS

An example will be taken to further illustrate the present invention in detail below. It should also be understood that the following example is only used to further illustrate the present invention rather than to limit the protection scope of the present invention. All non-essential improvements and adjustments which are made by those skilled in the art according to the above contents of the present invention shall fall within the protection scope of the present invention. The specific technological parameters of the following example are merely one example in an appropriate range, that is, those skilled in the art can make choices within the appropriate range through the description herein, but the choices are not limited to the specific values of the following example. Far-infrared feldspar powder was purchased from Inner Mongolia HuaChen Renewable Resource Technology Co. Ltd. The chemical components of the far-infrared feldspar powder are 75.5 percent of $SiO_2$, 10.5 percent of $Al_2O_3$, 0.45 percent of $Fe_2O_3$, 0.27 percent of $P_2O_5$, 0.75 percent of CaO, 1.03 percent of MgO, 430 ppm by weight of $Rb_2O$, 310 ppm by weight of $Y_2O_3$, 8.17 percent of $K_2O$, 2.68 percent of $Na_2O$, and 0.72 percent of loss on ignition.

Example 1

1. The material formula of a body was as follows: 5 percent of selected albite powder, 15 percent of medium-temperature sand, 15 percent of low-temperature sodium sand, 18 percent of bonded sand, 6 percent of Shaoguan ball clay, 12 percent of washed ball clay, 6 percent of calcined bauxite, 1 percent of black talc, 18 percent of potassium-aluminum sand, and 4 percent of primary slime. The chemical composition of the body was as follows: 63.5 to 65 percent of $SiO_2$, 21 to 24 percent of $Al_2O_3$, 0.4 to 0.7 percent of $Fe_2O_3$, 0.25 to 0.35 percent of $TiO_2$, 0.25 to 0.35 percent of CaO, 0.5 to 0.80 percent of MgO, 2.0 to 2.4 percent of $K_2O$, 2.6 to 3.0 percent of $Na_2O$, and 4.5 to 5.5 percent of loss on ignition. The materials were shaped by a press and dried to obtain the body. The expansion coefficient of the body was $7.4816\times10^{-6}$/K.

2. Far-infrared overglaze was applied on the body. The composition of the far-infrared overglaze formula was as follows: 35 percent of far-infrared feldspar powder, 13 percent of albite, 9 percent of kaolin, 20 percent of quartz sand, 10 percent of zirconium silicate, 8 percent of calcined kaolin, and 5 percent of alumina. The chemical composition of the far-infrared overglaze was as follows: 66.82 percent of $SiO_2$, 18.05 percent of $Al_2O_3$, 0.5 percent of $Fe_2O_3$, 0.26 percent of $TiO_2$, 0.58 percent of CaO, 0.5 percent of MgO, 3.23 percent of $K_2O$, 1.8 percent of $Na_2O$, 6.4 percent of $ZrO_2$, 150 ppm by weight of $Rb_2O$, 109 ppm by weight of $Y_2O_3$, and 1.27 percent of loss on ignition. The expansion coefficient of the far-infrared overglaze under 40° C. to 400° C. was $8.1816\times10^{-6}$/K. The ball-milled proportions were as follows: 70.4 to 70.91 percent of dry far-infrared overglaze, 0.16 percent of sodium tripolyphosphate, 0.15 percent of sodium methylcellulose, and 28.78 percent of water. The residue left on a 325-mesh sieve was 0.6 percent or less. The far-infrared overglaze was applied by adopting the spray glazing method, the specific weight of the far-infrared overglaze applied was 1.45, and the amount of the far-infrared overglaze applied was 500 g/m².

3. A pattern was inkjet-printed on the far-infrared overglaze.

4. Highly transparent far-infrared polished glaze was applied by adopting the waterfall method. The mineral composition of the highly transparent far-infrared polished glaze was as follows: 30 percent of far-infrared feldspar powder, 10 percent of zinc oxide, 6 percent of barium carbonate, 7 percent of calcined talc, 9 percent of kaolin, and 38 percent of glass frit. The chemical composition of the highly transparent far-infrared polished glaze was as follows: 59.38 percent of $SiO_2$, 6.53 percent of $Al_2O_3$, 0.21 percent of $Fe_2O_3$, 0.26 percent of $TiO_2$, 8.01 percent of CaO, 3.51 percent of MgO, 3.84 percent of BaO, 10.69 percent of ZnO, 3.76 percent of $K_2O$, 1.1 percent of $Na_2O$, 129 ppm by weight of $Rb_2O$, 93 ppm by weight of $Y_2O_3$, and 2.46 percent of loss on ignition. The expansion coefficient of the highly transparent far-infrared polished glaze under 40° C. to 400° C. was $6.1516\times10^{-6}$/K. The ball-milled proportions were as follows: 72.0 percent of dry highly transparent far-infrared polished glaze, 0.15 percent of sodium tripolyphosphate, 0.11 percent of sodium methylcellulose, and 27.74 percent of water. The residue left on a 325-mesh sieve was 0.6 percent or less. The highly transparent far-infrared polished glaze was applied by adopting the waterfall method, the specific weight of the highly transparent far-infrared polished glaze applied was 1.83, and the amount of the highly transparent far-infrared polished glaze applied was 310 g/m². The thickness of the glaze layer was 0.14 mm.

5. Highly abrasion-resistant far-infrared polished glaze was applied by adopting the waterfall method. The mineral composition of the highly abrasion-resistant far-infrared polished glaze was as follows: 17 percent of far-infrared feldspar powder, 12 percent of zinc oxide, 14 percent of barium carbonate, 7 percent of calcined talc, 9 percent of kaolin, 36 percent of glass frit, and 5 percent of 150-mesh corundum. The chemical composition of the highly abrasion-resistant far-infrared polished glaze was as follows: 46.36 percent of $SiO_2$, 10.06 percent of $Al_2O_3$, 0.21 percent of $Fe_2O_3$, 0.27 percent of $TiO_2$, 7.48 percent of CaO, 3.28 percent of MgO, 10.88 percent of BaO, 12.68 percent of ZnO, 2.64 percent of $K_2O$, 0.75 percent of $Na_2O$, 7 ppm by weight of $Rb_2O$, 53 ppm by weight of $Y_2O_3$, and 4.13 percent of loss on ignition. The expansion coefficient of the highly abrasion-resistant far-infrared polished glaze under 40° C. to 400° C. was $6.0816\times10^{-6}$/K. The ball-milled proportions were as follows: 72.0 percent of dry highly abrasion-resistant far-infrared polished glaze, 0.15 percent of sodium tripolyphosphate, 0.11 percent of sodium methylcellulose, and 27.74 percent of water. The residue left on a 325-mesh sieve was 0.6 percent or less. The highly abrasion-resistant far-infrared polished glaze was applied by adopting the waterfall method, the specific weight of the highly abrasion-resistant far-infrared polished glaze applied was 1.83, and the amount of the highly abrasion-resistant far-infrared polished glaze applied was 360 g/m². The thickness of the glaze layer was 0.18 mm.

6. The body was loaded into a kiln and fired at a firing temperature of 1,220° C. in the kiln for a firing period of 120 minutes.

7. The product was taken out of the kiln and polished by using resilient grinding blocks arranged into eight 140-mesh groups, four 240-mesh groups, four 300-mesh groups, eight 400-mesh groups, four 600-mesh groups, four 800-mesh groups, four 1,000-mesh groups, four 1,500-mesh groups, four 2,000-mesh groups and eight 3,000-mesh groups.

Figure 2:
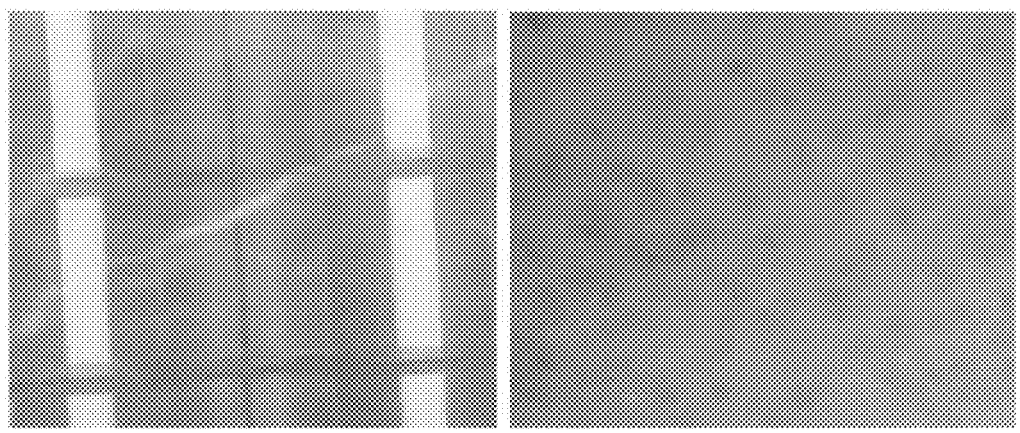
FIG. 2 is a diagram showing the surface of a polished glaze tile prepared in Example 1.

The surface of the obtained polished glaze tile is shown in FIG. 2, in which the left figure is a photo of the real polished glaze tile and the right figure is a photo of the glaze layer magnified 60 times. It can be seen from the left figure that the reflections of the fluorescent tubes are straight, and the polished glaze tile has a good mirror effect and strong transparency. It can be seen from the right figure that there are few bubbles, there are no large granular crystals and devitrifying components, and the inkjet-printed pattern is clear. The abrasion resistance of the polished glaze tile which was tested by a glazed tile abrasion tester (manufacturer: Ningxia Machinery Research Institute Co., Ltd., model: CYM-8) was 6,000 revolutions (class 4). The far-infrared normal emissivity of the polished glaze tile which was tested by using a Fourier infrared spectrometer was 0.892.

Example 2

The difference of Example 2 from Example 1 is that the mineral composition of the highly transparent far-infrared polished glaze was as follows: 25 percent of far-infrared feldspar powder, 8 percent of zinc oxide, 5 percent of barium carbonate, 9 percent of calcined talc, 8 percent of kaolin, and 45 percent of glass frit. The chemical composition of the highly transparent far-infrared polished glaze was as follows: 59.24 percent of $SiO_2$, 6.11 percent of $Al_2O_3$, 0.20 percent of $Fe_2O_3$, 0.26 percent of $TiO_2$, 8.38 percent of CaO, 4.12 percent of MgO, 3.89 percent of BaO, 8.84 percent of ZnO, 3.53 percent of $K_2O$, 1.02 percent of $Na_2O$, 107 ppm by weight of $Rb_2O$, 77 ppm by weight of $Y_2O_3$, and 2.11 percent of loss on ignition. The expansion coefficient of the highly transparent far-infrared polished glaze under 40° C. to 400° C. was $6.1816\times10^{-6}$/K.

Figure 3:
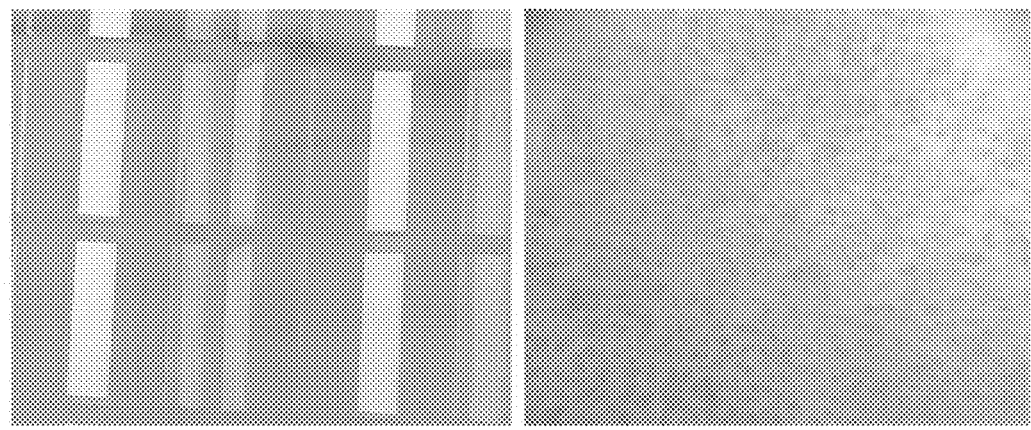
FIG. 3 is a diagram showing the surface of a polished glaze tile prepared in Example 2.

The surface of the obtained polished glaze tile is shown in FIG. 3, in which the left figure is a photo of the real polished glaze tile and the right figure is a photo of the glaze layer magnified 60 times. It can be seen from the left figure that the reflections of the fluorescent tubes are straight, and the polished glaze tile has a good mirror effect and strong transparency. It can be seen from the right figure that there are few bubbles, there are no large granular crystals and devitrifying components, and the inkjet-printed pattern is clear. The abrasion resistance of the polished glaze tile which was tested by the glazed tile abrasion tester was 6,000 revolutions (class 4). The far-infrared normal emissivity of the polished glaze tile which was tested by using the Fourier infrared spectrometer was 0.891.

Example 3

The difference of Example 3 from Example 1 is that the mineral composition of the highly transparent far-infrared polished glaze was as follows: 27 percent of far-infrared feldspar powder, 12 percent of zinc oxide, 8 percent of barium carbonate, 9 percent of calcined talc, 9 percent of kaolin, and 35 percent of glass frit. The chemical composition of the highly transparent far-infrared polished glaze was as follows: 54.51 percent of $SiO_2$, 6.18 percent of $Al_2O_3$, 0.21 percent of $Fe_2O_3$, 0.26 percent of $TiO_2$, 7.37 percent of CaO, 4.06 percent of MgO, 6.22 percent of BaO, 12.61 percent of ZnO, 3.44 percent of $K_2O$, 1.01 percent of $Na_2O$, 116 ppm by weight of $Rb_2O$, 84 ppm by weight of $Y_2O_3$, and 2.88 percent of loss on ignition. The expansion coefficient of the highly transparent far-infrared polished glaze under 40° C. to 400° C. was $6.1316\times10^{-6}$/K.

Figure 4:
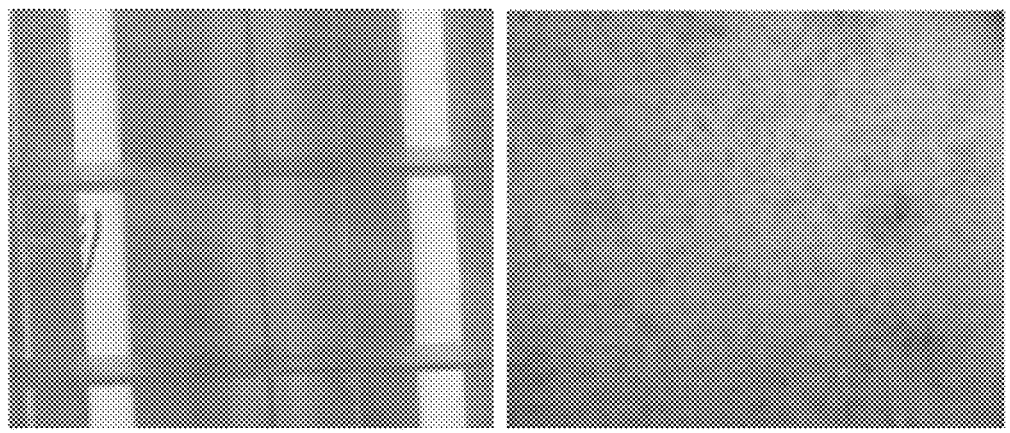
FIG. 4 is a diagram showing the surface of a polished glaze tile prepared in Example 3.

The surface of the obtained polished glaze tile is shown in FIG. 4, in which the left figure is a photo of the real polished glaze tile and the right figure is a photo of the glaze layer magnified 60 times. It can be seen from the left figure that the reflections of the fluorescent tubes are straight, and the polished glaze tile has a good mirror effect and strong transparency. It can be seen from the right figure that there are few bubbles, there are no large granular crystals and devitrifying components, and the inkjet-printed pattern is clear. The abrasion resistance of the polished glaze tile which was tested by the glazed tile abrasion tester was 6,000 revolutions (class 4). The far-infrared normal emissivity of the polished glaze tile which was tested by using the Fourier infrared spectrometer was 0.891.

Example 4

The difference of Example 4 from Example 1 is that the mineral composition of the highly abrasion-resistant far-infrared polished glaze was as follows: 15 percent of far-infrared feldspar powder, 15 percent of zinc oxide, 12 percent of barium carbonate, 8 percent of calcined talc, 9 percent of kaolin, 35 percent of glass frit, and 6 percent of 150-mesh corundum. The chemical composition of the highly abrasion-resistant far-infrared polished glaze was as follows: 44.77 percent of $SiO_2$, 10.87 percent of $Al_2O_3$, 0.20 percent of $Fe_2O_3$, 0.26 percent of $TiO_2$, 7.05 percent of CaO, 3.76 percent of MgO, 9.52 percent of BaO, 15.57 percent of ZnO, 2.43 percent of $K_2O$, 0.69 percent of $Na_2O$, 64 ppm by weight of $Rb_2O$, 46 ppm by weight of $Y_2O_3$, and 3.68 percent of loss on ignition. The expansion coefficient of the highly abrasion-resistant far-infrared polished glaze under 40° C. to 400° C. was $6.1816\times10^{-6}$/K.

Figure 5:
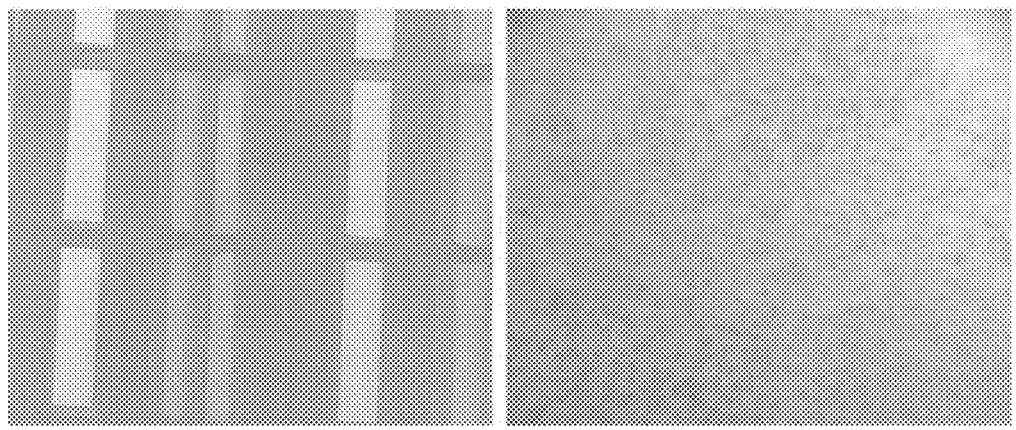
FIG. 5 is a diagram showing the surface of a polished glaze tile prepared in Example 4.

The surface of the obtained polished glaze tile is shown in FIG. 5, in which the left figure is a photo of the real polished glaze tile and the right figure is a photo of the glaze layer magnified 60 times. It can be seen from the left figure that the reflections of the fluorescent tubes are straight, and the polished glaze tile has a good mirror effect and strong transparency. It can be seen from the right figure that there are few bubbles, there are no large granular crystals and devitrifying components, and the inkjet-printed pattern is clear. The abrasion resistance of the polished glaze tile which was tested by the glazed tile abrasion tester was 6,000 revolutions (class 4). The far-infrared normal emissivity of the polished glaze tile which was tested by adopting a testing method using the Fourier infrared spectrometer was 0.89.

Example 5

The difference of Example 4 from Example 1 is that the mineral composition of the highly abrasion-resistant far-infrared polished glaze was as follows: 19 percent of far-infrared feldspar powder, 10 percent of zinc oxide, 12 percent of barium carbonate, 7 percent of calcined talc, 8 percent of kaolin, 40 percent of glass frit, and 4 percent of 150-mesh corundum. The chemical composition of the highly abrasion-resistant far-infrared polished glaze was as follows: 50.0 percent of $SiO_2$, 9.0 percent of $Al_2O_3$, 0.22 percent of $Fe_2O_3$, 0.27 percent of $TiO_2$, 8.31 percent of CaO, 3.38 percent of MgO, 9.52 percent of BaO, 10.73 percent of ZnO, 2.90 percent of $K_2O$, 0.82 percent of $Na_2O$, 82 ppm by weight of $Rb_2O$, 59 ppm by weight of $Y_2O_3$, and 3.60 percent of loss on ignition. The expansion coefficient of the highly abrasion-resistant far-infrared polished glaze under 40° C. to 400° C. was $6.0216\times10^{-6}$/K.

Figure 6:
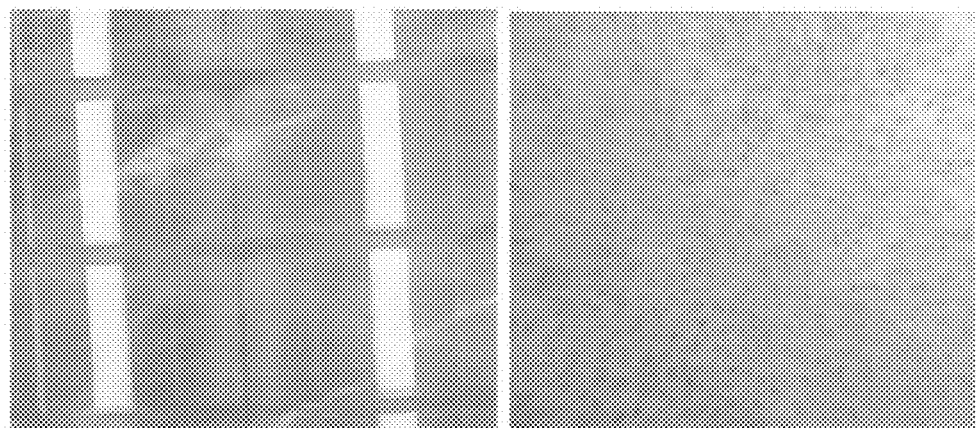
FIG. 6 is a diagram showing the surface of a polished glaze tile prepared in Example 5.

The surface of the obtained polished glaze tile is shown in FIG. 6, in which the left figure is a photo of the real polished glaze tile and the right figure is a photo of the glaze layer magnified 60 times. It can be seen from the left figure that the reflections of the fluorescent tubes are straight, and the polished glaze tile has a good mirror effect and strong transparency. It can be seen from the right figure that there are few bubbles, there are no large granular crystals and devitrifying components, and the inkjet-printed pattern is clear. The abrasion resistance of the polished glaze tile which was tested by a method using the glazed tile abrasion tester was 6,000 revolutions (class 4). The far-infrared normal emissivity of the polished glaze tile which was tested by using the Fourier infrared spectrometer was 0.89.

What is claimed is:

1. A preparation method for a high-wear-resistance far-infrared ceramic polished glazed tile, comprising:
    applying a far-infrared overglaze on a green body;
    ink-jet printing a pattern on the far-infrared overglaze;
    applying a transparent far-infrared polished glaze on the pattern;
    applying an abrasion-resistant far-infrared polished glaze on the transparent far-infrared polished glaze to produce a glazed body;
    firing the glazed body to produce a fired body; and
    polishing the fired body to obtain the high-wear-resistance far-infrared ceramic polished glazed tile, wherein
    a chemical composition of the far-infrared overglaze comprises 63 to 73 percent by weight of $SiO_2$, 16 to 24 percent by weight of $Al_2O_3$, 0.5 to 0.7 percent by weight of $Fe_2O_3$, 0.25 to 0.35 percent by weight of $TiO_2$, 0.3 to 0.6 percent by weight of CaO, 0.4 to 1.0 percent by weight of MgO, 3.0 to 4.0 percent by weight of $K_2O$, 1.5 to 2.5 percent by weight of $Na_2O$, 3.2 to 9.6 percent by weight of $ZrO_2$, 120 to 180 ppm by weight of $Rb_2O$, 90 to 130 ppm by weight of $Y_2O_3$, and 1.1 to 1.5 percent by weight of loss on ignition,
    a chemical composition of the transparent far-infrared polished glaze comprises 50 to 60 percent by weight of $SiO_2$, 6 to 8 percent by weight of $Al_2O_3$, 0.2 to 0.3 percent by weight of $Fe_2O_3$, 0.25 to 0.35 percent by weight of $TiO_2$, 5.5 to 8.5 percent by weight of CaO, 3.1 to 4.2 percent by weight of MgO, 3.5 to 6.5 percent by weight of BaO, 8.0 to 13.0 percent by weight of ZnO, 3.0 to 4.0 percent by weight of $K_2O$, 1.0 to 2.0 percent by weight of $Na_2O$, 100 to 155 ppm by weight of $Rb_2O$, 70 to 110 ppm by weight of $Y_2O_3$ and 2.0 to 3.5 percent by weight of loss on ignition,
    a chemical composition of the abrasion-resistant far-infrared polished glaze comprises 40 to 50 percent by weight of $SiO_2$, 9 to 11.5 percent by weight of $Al_2O_3$, 0.2 to 0.3 percent by weight of $Fe_2O_3$, 0.25 to 0.35 percent by weight of $TiO_2$, 6 to 8.5 percent by weight of CaO, 2.5 to 4.5 percent by weight of MgO, 9.5 to 13.0 percent by weight of BaO, 10.0 to 16.0 percent by weight of ZnO, 2.0 to 4.0 percent by weight of $K_2O$, 0.6 to 1.0 percent by weight of $Na_2O$, 60 to 110 ppm by weight of $Rb_2O$, 40 to 80 ppm by weight of $Y_2O_3$, and 3.5 to 5.0 percent by weight of loss on ignition, and
    the far-infrared overglaze, the transparent far-infrared polished glaze, and the abrasion-resistant far-infrared polished glaze include far-infrared feldspar powder to provide a far-infrared function, and the far-infrared feldspar powder contains a compound of magnesium aluminum silicate with a highly asymmetric lattice doped with impurity ions.

2. The preparation method of claim 1, wherein the mineral composition of the far-infrared overglaze prior to the firing comprises 30 to 40 percent by weight of far-infrared feldspar powder, 10 to 20 percent by weight of albite, 5 to 10 percent by weight of kaolin, 15 to 25 percent by weight of quartz sand, 5 to 15 percent by weight of zirconium silicate, 5 to 10 percent by weight of calcined kaolin, and 5 to 10 percent by weight of alumina.

3. The preparation method of claim 1, wherein the mineral composition of the transparent far-infrared polished glaze prior to the firing comprises 25 to 35 percent by weight of far-infrared feldspar powder, 8 to 12 percent by weight of zinc oxide, 5 to 8 percent by weight of barium carbonate, 7 to 9 percent by weight of calcined talc, 8 to 10 percent by weight of kaolin, and 35 to 45 percent by weight of glass frit.

4. The preparation method of claim 1, wherein the transparent far-infrared polished glaze is applied by adopting the waterfall method, and technological parameters of the waterfall method are as follows:
    the specific weight is 1.80 to 1.85 $g/cm^3$, and
    the weight is 300 $g/m^2$ to 350 $g/m^2$.

5. The preparation method of claim 1, wherein the mineral composition of the abrasion-resistant far-infrared polished glaze prior to the firing comprises 15 to 25 percent by weight of far-infrared feldspar powder, 10 to 15 percent by weight of zinc oxide, 12 to 16 percent by weight of barium carbonate, 7 to 9 percent by weight of calcined talc, 8 to 10 percent by weight of kaolin, 35 to 45 percent by weight of glass frit, and 4 to 6 percent by weight of 150-mesh corundum.

6. The preparation method of claim 1, wherein the abrasion-resistant far-infrared polished glaze is applied by adopting the waterfall method, and technological parameters of the waterfall method are as follows:
    the specific weight is 1.80 to 1.85 $g/cm^3$, and
    the weight is 350 $g/m^2$ to 400 $g/m^2$.

* * * * *